United States Patent [19]
Foss

[11] Patent Number: 6,100,472
[45] Date of Patent: Aug. 8, 2000

[54] CABLE LOCKING AND SEALING DEVICE

[75] Inventor: Victoria Ann Foss, Plymouth, United Kingdom

[73] Assignee: Bowthorpe PLC, Sussex, United Kingdom

[21] Appl. No.: 08/939,449

[22] PCT Filed: Apr. 14, 1994

[86] PCT No.: PCT/GB94/00789

§ 371 Date: Dec. 15, 1995

§ 102(e) Date: Dec. 15, 1995

[87] PCT Pub. No.: WO94/24747

PCT Pub. Date: Oct. 27, 1994

Related U.S. Application Data

[63] Continuation of application No. 08/535,018, Dec. 15, 1995, abandoned.

[30] Foreign Application Priority Data

Apr. 14, 1993 [GB] United Kingdom ................. 9307698
Jan. 13, 1994 [GB] United Kingdom ................. 9400697

[51] Int. Cl.$^7$ .................................................. H01R 13/58
[52] U.S. Cl. ............................................................ 174/77 R
[58] Field of Search ........................... 174/65 G, 65 R, 174/65 SS, 152 G, 157, 93, 135, 74 A, 75 B, 75 F, 77 R, 77 S; 248/56; 16/2

[56] References Cited

U.S. PATENT DOCUMENTS

| | | | |
|---|---|---|---|
| 1,912,115 | 5/1933 | Allen | 174/74 A X |
| 2,468,985 | 5/1949 | Krotz | 403/225 |
| 2,517,717 | 4/1950 | Rose | 285/192 |
| 2,550,358 | 4/1951 | Le Grand et al. | 174/77 S |
| 2,716,740 | 8/1955 | Parish | 174/77 R X |
| 2,977,456 | 3/1961 | Stiebel | 291/513 |
| 3,580,988 | 5/1971 | Orlowski et al. | 174/153 G |
| 4,460,227 | 7/1984 | Ball | 439/271 |
| 4,525,000 | 6/1985 | Bachle | 285/177 |
| 4,924,038 | 5/1990 | Klosin et al. | 174/135 |

FOREIGN PATENT DOCUMENTS

| | | |
|---|---|---|
| 926488 | 4/1946 | France ......................... 248/56 |
| 1 450 565 | 7/1966 | France . |
| 1 290 214 | 3/1969 | Germany . |
| 0 042 653 | 5/1990 | Germany . |
| 0 514 174 | 5/1992 | Germany . |
| 0 546 288 | 10/1992 | Germany . |
| 251827 | 5/1926 | United Kingdom . |
| 262532 | 12/1926 | United Kingdom . |
| 702451 | 1/1954 | United Kingdom . |
| 1 590 536 | 6/1981 | United Kingdom . |

*Primary Examiner*—Kristine Kincaid
*Assistant Examiner*—Chau N. Nguyen
*Attorney, Agent, or Firm*—David P. Gordon; David S. Jacobson; Thomas A. Gallagher

[57] ABSTRACT

A cable is sealed and locked in position within an entry port, e.g., of a cable splice enclosure, by a device which includes an elongate tubular body of elastomeric material for receiving the cable therethrough. Once the cable has been passed through the device, the cable and its device are pulled into the entry port and become radially compressed between the port and the cable. Annular projections abut opposite ends of the port to prevent subsequent axial movement of the device or the cable.

19 Claims, 5 Drawing Sheets

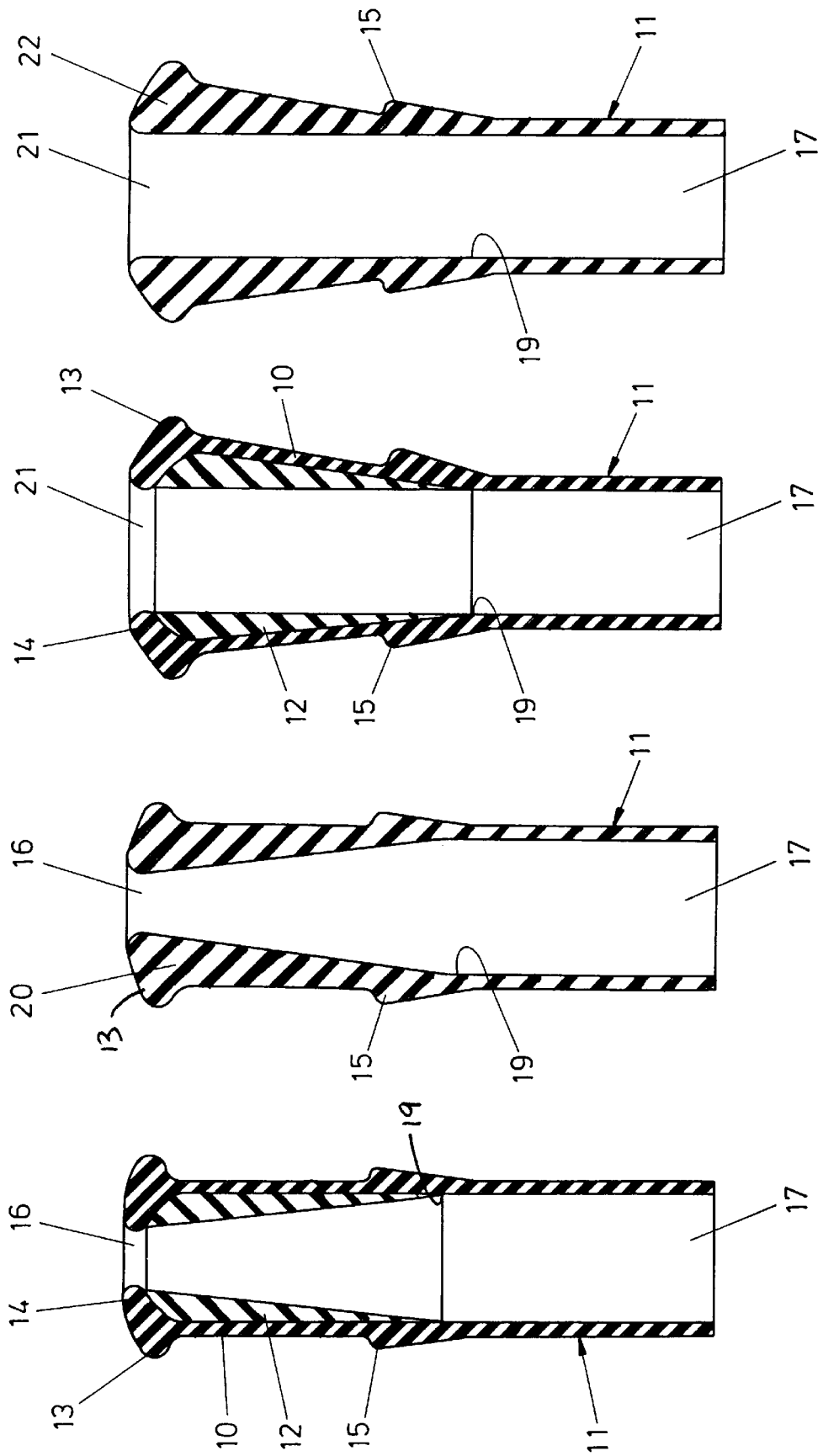

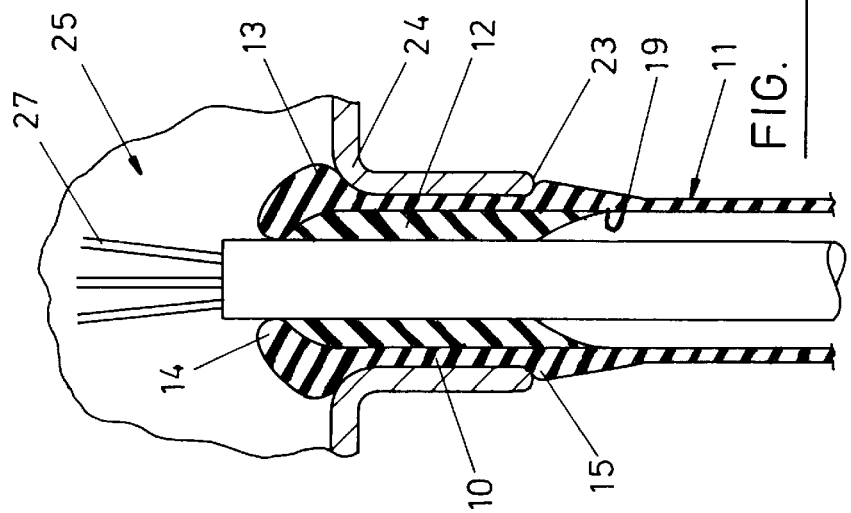
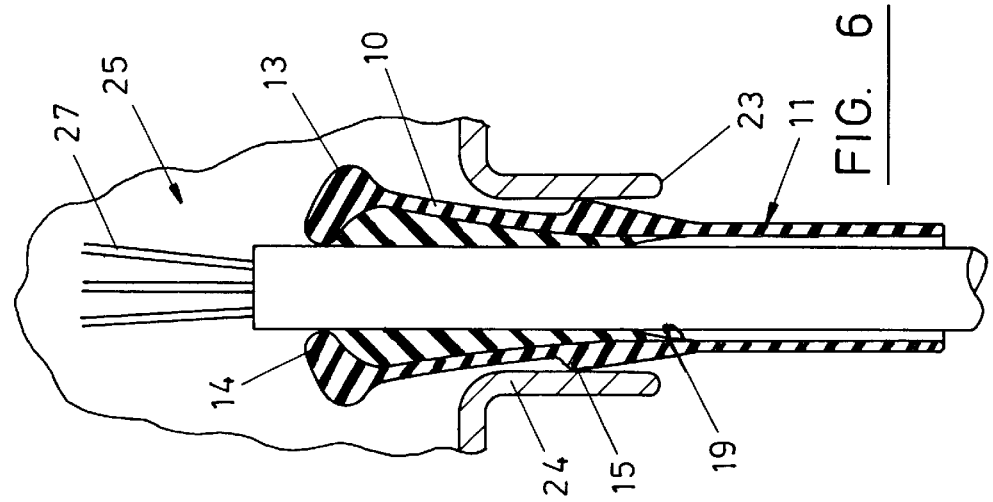
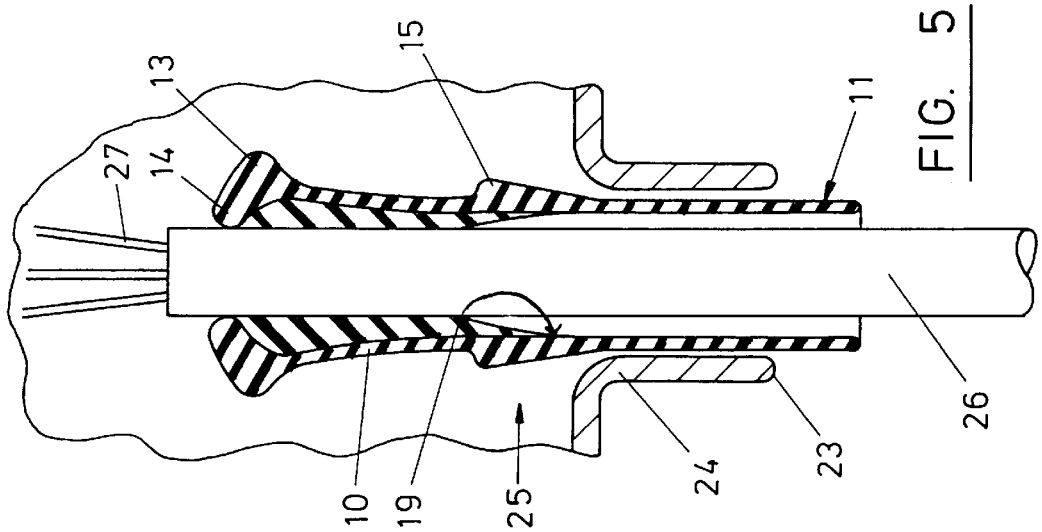

CABLE LOCKING AND SEALING DEVICE

This application is a continuation of Ser. No. 08/535,018 Dec. 15, 1995 abn, which is a 371 of PCT/GB94/00789 Apr. 14, 1994.

BACKGROUND OF THE INVENTION

This invention relates to a device for sealing and locking a cable entering or leaving a cable splice closure or the housing of electrical equipment. The device is suitable for a wide range of different types of cable, including copper conductor, coaxial and optical fibre cables.

SUMMARY OF THE INVENTION

Various types of sealing and locking devices are known, for use on power or telecommunications cables to seal against the ingress of moisture and foreign matter into a splice closure or equipment housing which the cable enters, and also to resist the cable being pulled out. In some types, the cable sealing and locking device comprises a number of components, each component fulfilling a separate function: for example the device may comprise a sealing member, a cable retaining or locking member, and an actuating member which is movable to actuate the sealing and/or locking members. Typically the sealing member comprises a compressible, flexible rubber material or a self-amalgamating tape or a mastic, which is compressed between the cable and the entry port of the splice enclosure or equipment housing, or between the body of the sealing and locking device and the cable or the entry port, or both. The compressible, flexible rubber seal is typically in the shape of an annular ring or cylindrical sleeve, which may be split so that it can be wrapped around the cable, and which distorts when compressed, to make contact with the adjacent mating surfaces. In some known devices, a separate component is screwed into the cable entry port to compress the sealing member around the cable with sufficient pressure to prevent the cable being pulled out subsequently. These multiple-component cable sealing and locking devices are of complicated construction and expensive to manufacture, time consuming to install and require a special installation tool.

It is also known to recover a heat-shrinkable sleeve, internally coated with a hot melt adhesive, partly onto the cable and partly onto a tubular entry port which protects from the splice closure or equipment housing. The recovered sleeve both seals the entry port and also locks the cable against being pulled out. However, this technique requires the entry port to be of a material which is resistant to high temperatures and exhibits a relatively high peel strength between the hot melt adhesive of the heat-shrinkable sleeve and entry port. Also, in order to install the heat-shrinkable sleeve, it is necessary to heat it to a temperature of 90 to 135° C., which poses a safety risk in some circumstances (e.g. when underground in confined spaces, or in aerial applications where mobility is restricted and climatic conditions are adverse).

We have now devised a cable sealing and locking device which is of relatively simple and inexpensive construction, which can be installed quickly and easily without the need of a heat source or any particularly high level of skill or training on the part of the installer.

In accordance with this invention, there is provided a cable sealing and locking device, which comprises an elongate tubular body of elastomeric material for receiving a cable therethrough, and arranged to be pulled into an entry port so that the tubular body of the device becomes radially compressed between the cable and the entry port.

Preferably the elongate tubular body of the device is formed with two annular, external projections, one at or adjacent one end of the tubular body and the other intermediate the two ends of the tubular body. These two annular projections are arranged to abut opposite ends of the entry port, when the device is installed in the entry port, to prevent movement of the device in either axial direction.

Preferably the exterior of the elongate tubular body tapers from its one end and toward the opposite end, at least over the portion between the two external annular projections. Instead the interior of the tubular body may taper towards its one end, at least over the portion between the two external annular projections.

Preferably the interior of the tubular body is formed with a series of annular grooves, at least over the portion between the two external annular projections.

Preferably the exterior of the tubular body is formed with a series of annular grooves, at least between the second of its external annular projections and its opposite end.

The tubular body of the device may comprise an outer sleeve of relatively incompressible elastomeric material, and an inner sleeve of relatively soft and compressible elastomeric material. The inner sleeve preferably extends from a point at or adjacent the one end of the tubular body, to a point at or adjacent the second external annular projection of the tubular body. Preferably the wall thickness of the inner sleeve tapers in the direction away from the one end of the tubular body.

Where the tubular body comprises inner and outer sleeves as described above, preferably the outer sleeve is formed with an internal annular projection at or adjacent the one end of the tubular body. Preferably the internal and external annular projections, at this end of the body, lie generally on a cone directed axially outwardly of this end of the body: thus, if after installation a force is applied to the cable tending to pull it out of the cable entry port, the cable pulls on the internal annular projection to deflect the internal and external annular projections onto a shallower cone and the internal annular projection grips the cable more firmly. Preferably the inner surface of the end of the inner sleeve substantially corresponds in diameter to the inner periphery of the internal annular projection of the outer sleeve.

Preferably the second external annular projection of the tubular body has a shoulder facing the first external annular projection, and a gradually tapering opposite face. The latter tapering face facilitates pulling of the device into position within the cable entry port of the cable splice enclosure or equipment housing.

Preferably the material of the outer sleeve comprises an Ethylene propylene rubber (EPR). Preferably the material has a Shore hardness value of 50 to 90. Preferably the material has a good resistance to permanent set, resistance to tear, moisture penetration, high temperatures, ozone and chemical attack from a wide variety of solvents, lubricants, etc. used during cable manufacture, cleaning or installation.

Preferably the material of the inner sleeve comprises a liquid silicone. Preferably the material has a Shore hardness value of 15 to 60. Preferably the material has a good resistance to permanent set, moisture penetration and to solvents or chemicals used during cable manufacture, cleaning or installation.

The material of the cable sealing and locking device can be coloured according to the size or type of cable for which the device is intended.

The tubular body of the device may have a single through-passage. Alternatively, it may have two through-passages side-by-side, which may be separate from each other or may be joined via a narrow, longitudinal slit: the device is then suitable for use with so-called "siamese" cables which comprise a pair of cables joined side-by-side by a narrow, longitudinal web.

The tubular body of the device may be provided with a coating of lubricating and/or sealing substance over its internal surface.

Also in accordance with this invention, there is provided a method of installing a cable through a cable entry port of a cable splice enclosure or of a housing of electrical equipment, the method comprising passing the cable through a cable sealing and locking device as defined above, then pulling the cable, together with its sealing and locking device, into the cable entry port so that the device becomes radially compressed between the cable entry port and the cable.

Generally the cable can only be released, once installed in the above manner, by cutting the sealing and locking device around its circumference, at the outer end of the cable entry port, then pulling the cable and remaining portion of the device from the inner end of the entry port.

Embodiments of this invention will now be described by way of examples only and with reference to the accompanying drawings.

BRIEF DESCRIPTION OF THE DRAWINGS

FIG. 1 is a longitudinal section through a first embodiment of cable sealing and locking device in accordance with this invention;

FIG. 2 is a longitudinal section through a second embodiment of cable sealing and locking device in accordance with the invention;

FIG. 3 is a longitudinal section through a third embodiment of cable sealing and locking device in accordance with this invention;

FIG. 4 is a longitudinal section through a fourth embodiment of cable sealing and locking device in accordance with this invention;

FIG. 5 is a longitudinal section through the first embodiment of cable sealing and locking device fitted to a cable and at a first stage of introduction into a cable entry port;

FIG. 6 is a similar section to FIG. 5 showing the device at a later stage in the process of installation into the cable entry port;

FIG. 7 is a similar section to FIG. 5 showing the device when fully installed in the cable entry port;

DETAILED DESCRIPTION OF THE PREFERRED EMBODIMENT

Figures 8, 9:
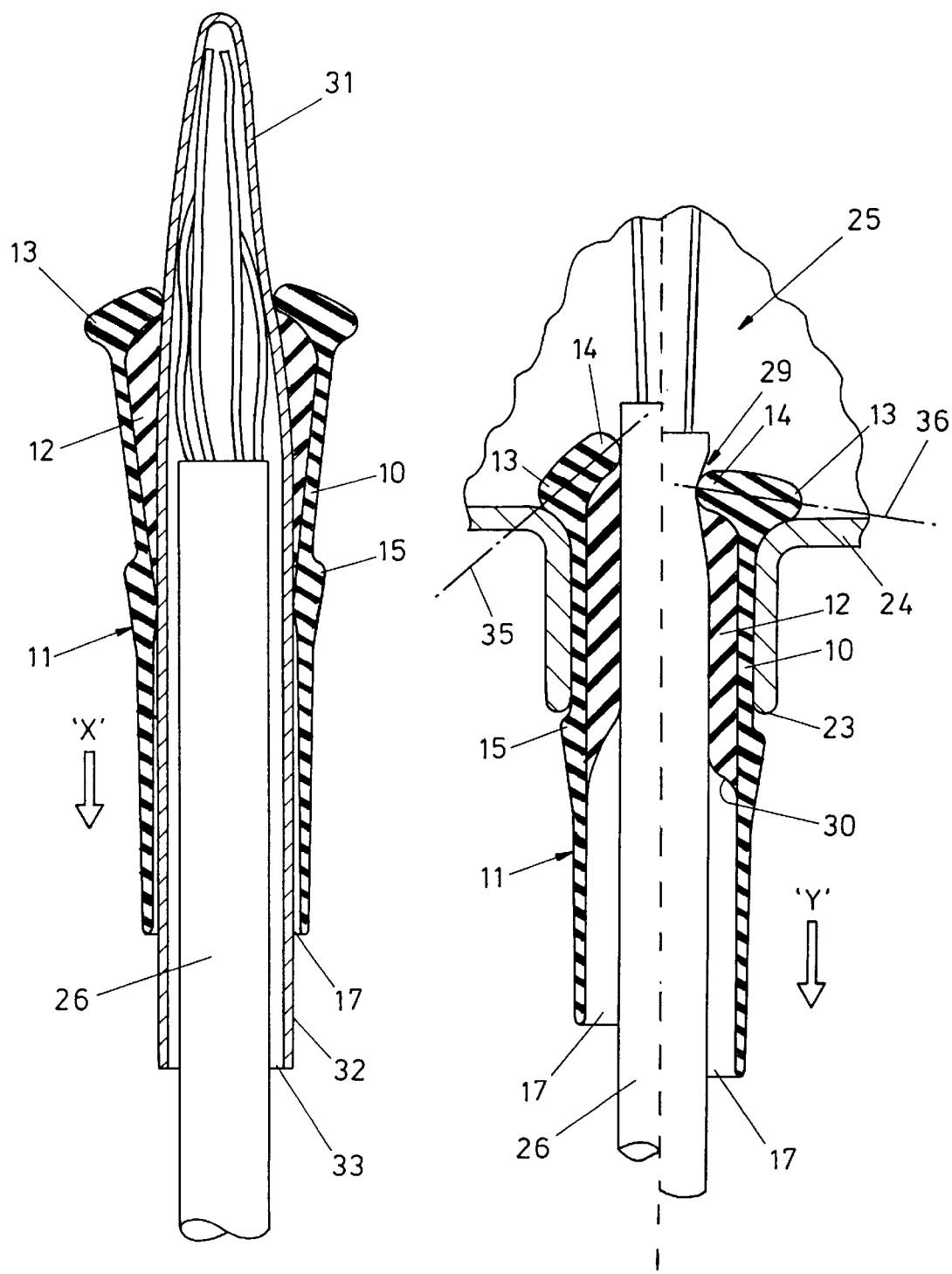
FIG. 8 is a longitudinal section through the device of FIG. 1, shown being slid over an applicator tool and onto a cable.
FIG. 9 is a longitudinal section through the device of FIG. 1 when installed, the left-hand side showing the device in relaxed condition and the right-hand side showing the device when a tensile load is applied to the cable.

Referring to FIG. 1 of the drawings, there is shown a cable sealing and locking device in the form of an elongate cylindrical body 11 which comprises an outer sleeve 10 and an inner sleeve 12 which extends for approximately one half of the length of the outer sleeve. The outer sleeve 10 is of generally uniform internal and external diameters, but has internal and external projections 14,13 at one end 16 and an external projection 15 at or adjacent its mid-length. The inner sleeve 12 tapers internally from its inner end 19, to merge with the inner periphery of the internal projection 14 at the end 16. The external projection 15 has an abrupt shoulder facing the external projection 13, whilst it tapers gradually in the opposite direction to merge with the outer surface of the outer sleeve 10.

FIG. 2 shows a device which differs from the device of FIG. 1, in that it is formed as one-piece 20 having a uniform external diameter, apart from the annular projections 13 and 15, and a uniform internal diameter from the end 17 to a point 19 at or adjacent its mid-length, and then tapering to the end 16.

FIG. 3 shows a device corresponding to the device of FIG. 1, and comprising outer and inner sleeves 10,12, except that the internal diameter of the body 11 is uniform over its whole length, the inner sleeve 12 tapers internally from the end 21 of the body 11 to the end 19 of the inner sleeve, and the outer sleeve 10 tapers externally from the end 21 to approximately the end 19 of the inner sleeve.

FIG. 4 shows a device which differs from the device of FIG. 3, in that it is formed as one-piece 22 having a uniform internal diameter and tapering externally from its end 21 to a point 19 approximately at its mid-length.

In the devices of FIGS. 1 and 3, the material of the inner sleeve 12 is substantially softer and therefore substantially more easily compressible than the material of the outer sleeve 10.

FIGS. 5 to 7 show successive stages in the procedure of introducing and securing a cable 26 in a cable entry port 24 of a cable splice enclosure indicated at 25, using a cable sealing and locking device as shown in FIG. 1. Initially the end of the cable 26 is passed through the device 11: the insulation is cut back from the end of the cable 26 to bare end lengths of the individual conductors (or optical fibres) 27 which are to be spliced with the conductors (or optical fibres) of other cables entering the enclosure through similar cable entry ports of the enclosure. The locking and sealing device 11 is preferably fitted to the end of the cable once the end of the cable has been inserted through the cable entry port 24 and into the enclosure. Then the installer grips the cable and device 11 with his fingers and pulls them together through the tubular entry port 24 in the outwards direction relative to the enclosure, pulling the annular projection 15 through the port 24 as shown in FIG. 6, until finally the device reaches the position shown in FIG. 7. It will be appreciated that the inner sleeve 12 becomes radially compressed as the device 11 is pulled through the cable entry port 24. In the final position, shown in FIG. 7, the external annular projection 13 of the device 11 abuts the inner end of the entry port 24 and the external projection 15 of the device abuts the outer end 23 of the entry port. Accordingly, the annular projections 13,15 prevent the device 11 from moving in either axial direction, and the cable is prevented from moving because it is firmly gripped by the device 11.

FIG. 8 shows the use of a tool 32 for applying the cable locking and sealing device 11 to the cable 26. The tool 32 comprises a tubular sleeve having an open end 33 and an opposite, tapering end 31. As shown, the end of the cable 26 is inserted into the tool 32 from its open end 33: the device 11 is fitted over the tapering end of the tool 32, and pulled along the tool 32, in the direction of the arrow X indicated in FIG. 8, so radially expanding the device 11. The device is pulled further in this direction, to slide off the tool 32 and onto the cable 26, or instead the device 11 and cable 26 can be held still whilst the tool 32 is retracted in the direction opposite to arrow X.

FIG. 9 shows an installed cable 26 and sealing and locking device 11 as in FIG. 7. The left hand side of FIG. 9 shows the device 11 when there is no load on the cable 26, whilst the right hand side of FIG. 9 shows the device 11 when the cable 26 is subjected to a tensile force in the direction of the arrow Y. In the relaxed condition, the external and internal annular projections 13, 14 lie on an imaginary cone having a slope indicated by line 35, but under the application of a force to the cable, the cable pulls the projections 13,14 into a much shallower imaginary cone having a slope indicated by line 36, and the inner annular projection 14 bites into the cable 26, as shown at 29, to grip it more tightly at this location. Also, the inner sleeve 12 is in shear and so deforms at its end 30, as shown. A gap will appear between the end 23 of the cable entry port and the external annular projection 15, but is taken up again when the tensile load is removed from the cable (and the condition shown in the left hand side of FIG. 1 is restored).

Figure 10:
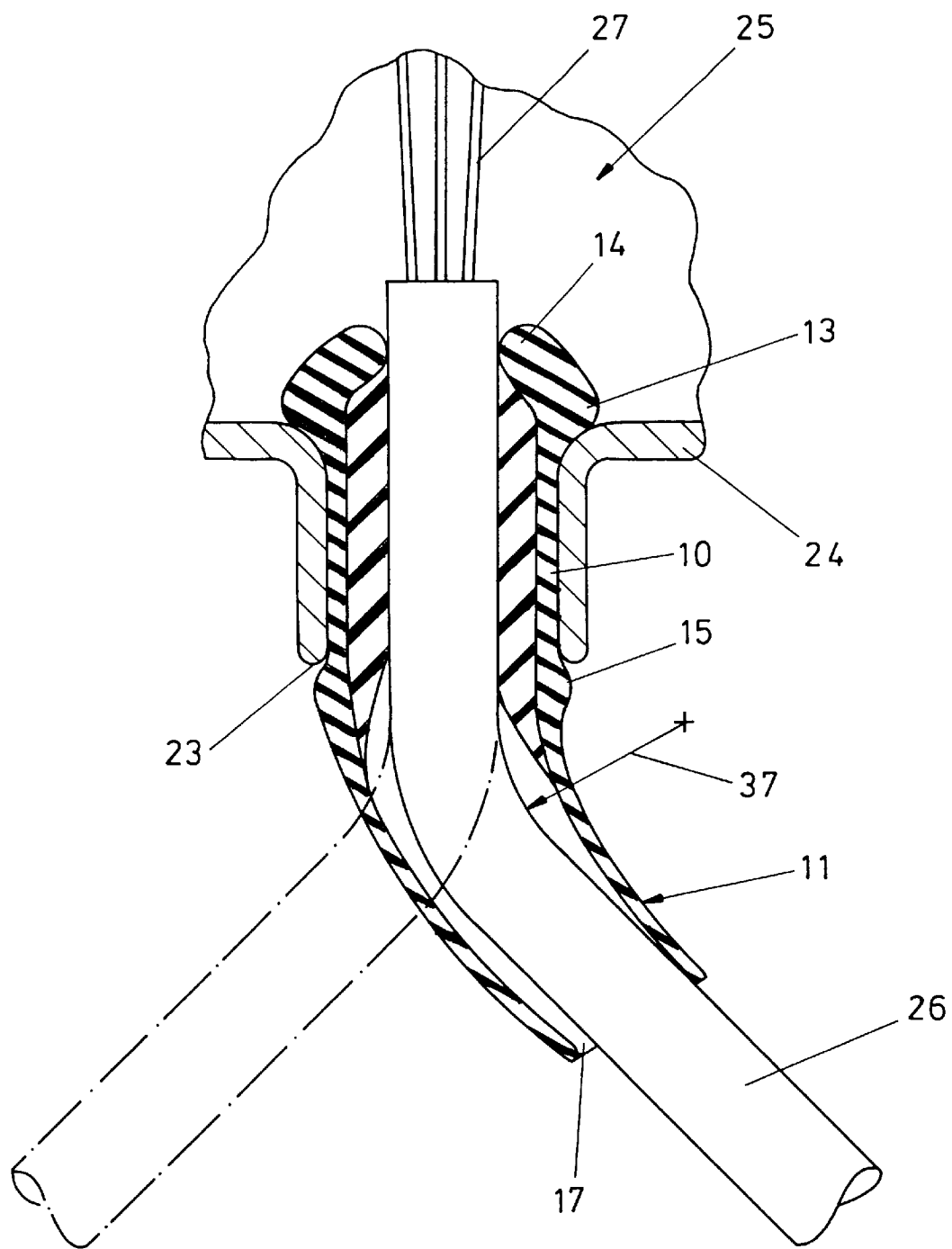
FIG. 10 is a longitudinal section through the device of FIG. 1 when installed, and showing the effect of bending the cable relative to the cable entry port.

FIG. 10 also shows the arrangement of FIG. 7, and illustrates that when the cable 26 is bent away from a straight, axial position relative to the cable entry port 24, the free end portion of the sleeve 11 limits the angle through which the cable can be deflected, and so ensures that the cable is not bent to a radius (indicated at 37) less than the minimum permitted bending radius of the cable.

Figure 11:
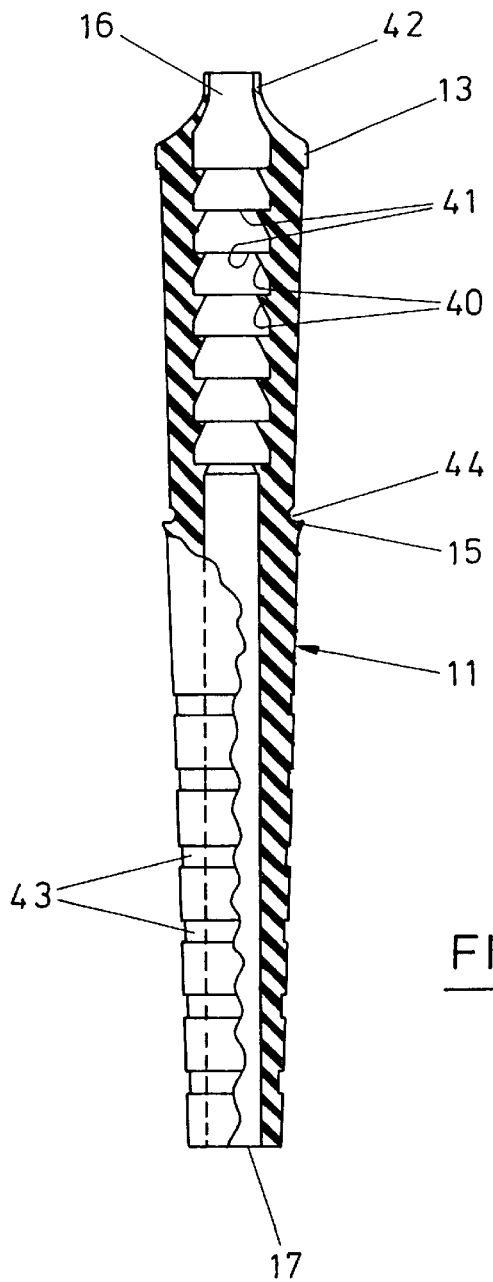
FIG. 11 is a longitudinal section through a further embodiment of cable sealing and locking device in accordance with this invention.

FIG. 11 shows a further embodiment of cable sealing and locking device 11, formed as a one-piece tubular body of uniform internal diameter, but with a series of internal annular grooves 40, which define saw-tooth section ridges 41 between adjacent grooves. The end 16 of the device 11 is formed into an externally-tapered projection 42. The device 11 tapers over its outer surface, towards its opposite end 17, and the portion between the external annular projection 15 and the end 17 is formed with annular grooves 43. A further annular groove 44 is formed in the portion of the device 11 between its two external annular projections 13 and 15, immediately adjacent the latter projection.

The material of the one-piece device of FIG. 11 may be relatively hard, but the internal tapering-section ridges 41 flex readily when the device is subjected to radial compression, upon pulling through the cable entry port.

Figure 12:
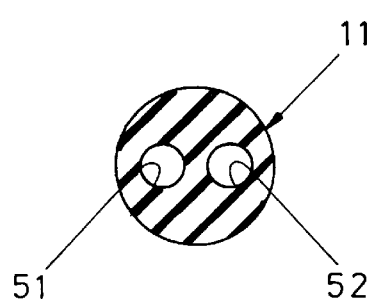
FIG. 12 is a cross-section through a modified device in accordance with this invention.
Figure 13:
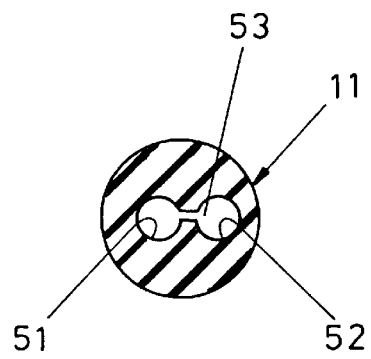
FIG. 13 is a cross-section through another modified device in accordance with this invention.

Whilst the cable sealing and locking devices which have been described have a single through-passage of circular cross-section, they may instead be formed with a pair of such passages side-by-side. These passages e.g. 51, 52 may be spaced apart and separate from each other as shown in FIG. 12, or joined together by a narrow slit 53 as shown in FIG. 13: the latter arrangement is particularly appropriate for so-called "siamese" cables, which comprise a pair of side-by-side cables joined by a narrow web.

The through-passage (or through passages) of each of the above-described devices may be provided with a coating of grease or similar substance, to make it easier for the device to slide onto the cable and to improve the seal between the device and the cable when installed in the cable entry port.

It will clearly be appreciated from the drawings that in each embodiment the sealing and locking device includes a tubular body of elastomeric material having an annular external projection 15 intermediate its end 14 and its opposite tail end 17. The tubular body has an elongate first portion extending from its end 14 to the annular external projection 15, this elongate first portion having a tubular wall which tapers in thickness from the end 14 of the body the projection 15. As clearly seen in the drawings, the length of the elongate first portion is typically equal to or greater than its outer diameter (at least three times greater in the embodiment of FIG. 11). Moreover, the length of the first portion is substantially greater than the diameter of the first portion at the projection 15. The tubular body further includes an elongate tail portion which extends from the annular external projection 15 to the tail end 17 of the device. As clearly seen in the drawings, this elongate tail portion has a length at least twice its outer diameter (at least four times greater in the embodiment of FIG. 11), and is capable of flexing through an angle of at least 30° (see FIG. 10) relative to the elongate first portion of the device. Moreover, as seen clearly in the drawings, the overall length of the device is at least three times the diameter of its tail end (at least ten times greater in the embodiment of FIG. 10).

What is claimed is:

1. A device for sealing and locking a cable within an elongate entry port of a cable splice enclosure or of a housing of electrical equipment, said device comprising:
    an elongate tubular body of elastomeric material for receiving said cable therethrough, said elongate tubular body having
    (i) a first end,
    (ii) an opposite tail end having an outer diameter,
    (iii) a first annular external projection intermediate said first end and said tail end,
    (iv) an elongate first portion extending from said first end to said first annular external projection and having a tubular wall provided with a plurality of radially-inward projecting annular ridges, said tubular wall tapering in thickness from said first end to said annular external projection, said annular ridges being adapted to frictionally engage the cable so as to substantially prevent movement of the cable through said device when said device and the cable are installed in the splice enclosure or the electrical equipment housing, and
    (v) an elongate tail portion having an outer diameter and a length at least twice said outer diameter of said tail portion and being capable of flexing through an angle of at least 30° relative to said elongate first portion.

2. A device according to claim 1, wherein:
    said first end of said tubular body includes a second annular external projection.

3. A device according to claim 1, wherein:
    said tubular wall has an exterior surface which tapers from said first end of said tubular body to said first annular external projection.

4. A device according to claim 1, wherein:
    said elongate tail portion has an exterior surface formed with a series of annular grooves.

5. A device according to claim 1, wherein:
    said elongate tubular body is formed with two longitudinal through-passages.

6. A device according to claim 5, wherein:
    wherein said elongate tubular body is formed with a longitudinal slit which interconnects said two longitudinal through-passages.

7. A device according to claim 1, wherein:
said elongate tubular body has a length at least three times said outer diameter of said tail end.

8. A device according to claim 1, wherein:
said elongate first portion has an outer diameter and a length greater than or equal to said outer diameter of said first portion.

9. A device according to claim 1, wherein:
said first portion has a length from said first end to said first annular external projection, and an outer diameter at said first annular external projection, said length being substantially greater than said outer diameter of said first portion.

10. A device for sealing and locking a cable within an elongate entry port of a cable splice enclosure or of a housing of electrical equipment, said device comprising:
an elongate tubular body of elastomeric material, said tubular body having
  (i) a first end and an opposite tail end having an outer diameter,
  (ii) a first annular external projection intermediate said first end and said tail end,
  (iii) an elongate first portion extending from said first end to said first annular external projection and having a tubular wall which tapers in thickness from said first end to said first annular external projection, and
  (iv) an elongate tail portion extending from said first annular external projection to said tail end having an outer diameter and a length at least twice the outer diameter of said tail portion and being capable of flexing through an angle of at least 30° relative to said elongate first portion,
said elongate tubular body having an outer sleeve of a first elastomeric material and an inner sleeve of a second material, said inner sleeve extending from said first end to said first annular external projection and said second material being soft and compressible relative to said first material.

11. A device according to claim 10, wherein:
said outer sleeve includes a second annular external projection at said first end of said tubular body.

12. A device according to claim 11, wherein:
said outer sleeve includes a first annular internal projection at said first end of said tubular body, said first annular internal projection and said second annular external projection lying generally on an imaginary cone directed axially outward from said tubular body.

13. A device according to claim 11, wherein:
said inner sleeve tapering from said first end to said first annular external projection.

14. A device according to claim 10, wherein:
said elongate tubular body has a length at least three times said outer diameter of said tail end.

15. A device according to claim 10, wherein:
said elongate first portion has an outer diameter and a length greater than or equal to said outer diameter of said first portion.

16. A device according to claim 10, wherein:
said first portion has a length from said first end to said first annular external projection, and an outer diameter at said first annular external projection, said length being substantially greater than said outer diameter of said first portion.

17. A method of installing a cable through an elongate cable entry port of a cable splice enclosure or of a housing of electrical equipment, said method comprising:
  (a) providing a cable sealing and locking device which includes an elongate tubular body of elastomeric material having
    (i) a first end and an opposite tail end having an outer diameter,
    (ii) an annular external projection intermediate said first end and said tail end,
    (iii) an elongate first portion extending from said first end to said annular external projection, said elongate first portion having a tubular wall which tapers in thickness from said first end to said annular external projection, and
    (iv) an elongate tail portion extending from said annular external projection to said tail end, and having an outer diameter and a length at least twice said outer diameter of said tail portion and being capable of flexing through an angle of at least 30° relative to said elongate first portion;
  (b) passing a free end of said cable through said cable sealing and locking device until said free end of said cable projects from said tail end of said cable sealing and locking device;
  (c) inserting said free end of said of said cable through said cable entry port from one end thereof until said elongate tail portion of said cable sealing and locking device projects from the other end of the cable entry port; and
  gripping said elongate tail end portion of said cable sealing and locking device, pulling said cable sealing and locking device tail end first, together with the cable, into the cable entry port until said elongate tail portion of said tubular body projects from said entry port, said first portion of said tubular body is located within said entry port and said tubular wall is radially compressed between said cable entry port and the cable.

18. A method according to claim 17, wherein:
said elongate first portion has an outer diameter and a length greater than or equal to said outer diameter of said first portion.

19. A method according to claim 17, wherein
said first portion has a length from said first end to said first annular external projection, and an outer diameter at said first annular external projection, said length being substantially greater than said outer diameter of said first portion.

* * * * *